United States Patent [19]

Miki et al.

[11] Patent Number: 5,550,539
[45] Date of Patent: Aug. 27, 1996

[54] JOY STICK TYPE OPERATING LEVER DEVICE

[75] Inventors: Masatoshi Miki; Toshio Kuwabara; Manabu Tamura, all of Tokyo, Japan

[73] Assignee: Shin Caterpillar Mitsubishi Ltd., Tokyo, Japan

[21] Appl. No.: 354,082

[22] Filed: Dec. 6, 1994

[30] Foreign Application Priority Data

Dec. 9, 1993 [JP] Japan ................. 5-340752

[51] Int. Cl.⁶ ................................. H03M 11/00
[52] U.S. Cl. ...................... 341/20; 74/471 XY
[58] Field of Search ................ 341/20; 345/161; 340/825.23; 74/471 XY; 200/6 A; 273/148 B

[56] References Cited

U.S. PATENT DOCUMENTS

| | | | |
|---|---|---|---|
| 4,161,726 | 7/1979 | Burson et al. | 341/20 |
| 5,134,395 | 7/1992 | Stern | 341/20 |
| 5,164,722 | 11/1992 | Laroze et al. | 341/20 |

*Primary Examiner*—John K. Peng
*Assistant Examiner*—Andrew Hill
*Attorney, Agent, or Firm*—Oliff & Berridge

[57] ABSTRACT

To allow data from the joy stick type operation levers to be output to the main control section side using a minimum number of output wires, a joy stick type operating lever is provided with a sub-control section which receives signals from the joy stick and other related sources, digitizes and arranges the signals according to a present order and outputs the signals to a main control circuit.

14 Claims, 6 Drawing Sheets

JOY STICK TYPE OPERATING LEVER DEVICE

BACKGROUND OF THE INVENTION

1. Field of the Invention

The present invention relates to a joy stick type operating lever device used in construction equipment such as hydraulic shovels, bulldozers, or cranes, or in ships.

2. Description of the Related Art

In general, in such construction equipment, there may be provided an operating lever which can be operated two dimensionally, for example, forward and backward, right and left, or vertically and horizontally, in the X or Y direction. In a so-called joy stick type operating lever in which each operating angle of the operating levers in the two dimensional direction is detected by a corresponding lever operating detecting means, various operation controls are carried out based on detection signal data from each of the lever operation angle detecting means. This requires the detection signal of each of the lever operation angle detecting means to be input to the main control section side. Detection signals have been conventionally input to the main control section using a total of at least four lines, two lines for outputting signals from each of the lever operation angle detection means, and a supply line and a ground line. This meant that an equal number of connectors as lines had to be provided at the main control section side.

In operating equipment such as hydraulic shovels, two joy stick type operating levers are usually used for operating the operation section. In addition, switches are often provided for the operating levers to arbitrarily execute a desired function. When inputting signal data from these switches to the main control section a total of five lines are required for one operating lever. These lines are, as shown in FIG. 6, the supply line +B, the ground wire GND, signal data wires SIG 1 and SIG 2 for the X direction lever operation angle detecting means 2 and the Y direction lever operation angle detecting means 3 respectively, and the wire SW 1 for the switches 6. This means that five pin connectors are required at the main control section side. When there are two operating levers, two sets of five pin connectors must be provided, which causes the wiring to become complicated and increases the number of parts used.

In order to overcome this problem, the power line and the ground line, which extend from each of the operating levers, have been connected to form a common line. However, a total of eight wires are still necessary because this decreases the number of wires only by two, so that this method does not really simplify the wiring. In recent years, various operations such as moving operations have been frequently carried out by means of control commands from the main control section, which have been generated based on the electrical detection of the operations with operation input detecting sensors or change-over switches. When operations are carried out in such a way, however, the number of wire connections to the main control section increases, which not only makes wiring troublesome and complicated, but also increases costs. In addition, the greater number of connector pins increases the occurrence of contact failure, which may affect the reliability of the lever device.

SUMMARY OF THE INVENTION

To these ends, the present invention aims at providing a joy stick type operating lever device provided with at least lever operation angle detecting means for detecting operation angle in the X or Y direction of a joy stick type operation lever, the joy stick type operating lever device provided with a sub-control section for accepting signal data, which have been output from these means, and arranging each of the input signal data into serial data, which is output to the main control section side.

The present invention is so constructed as allowing signal data from the joy stick type operating levers to be sent to the main control section side using a minimum number of wires.

The above and further objects and advantages of the present invention will become clear from the following description of preferred embodiments taken in conjunction with the accompanying drawings wherein like numerals indicate like parts.

DESCRIPTION OF THE PREFERRED EMBODIMENTS

Figure 1:
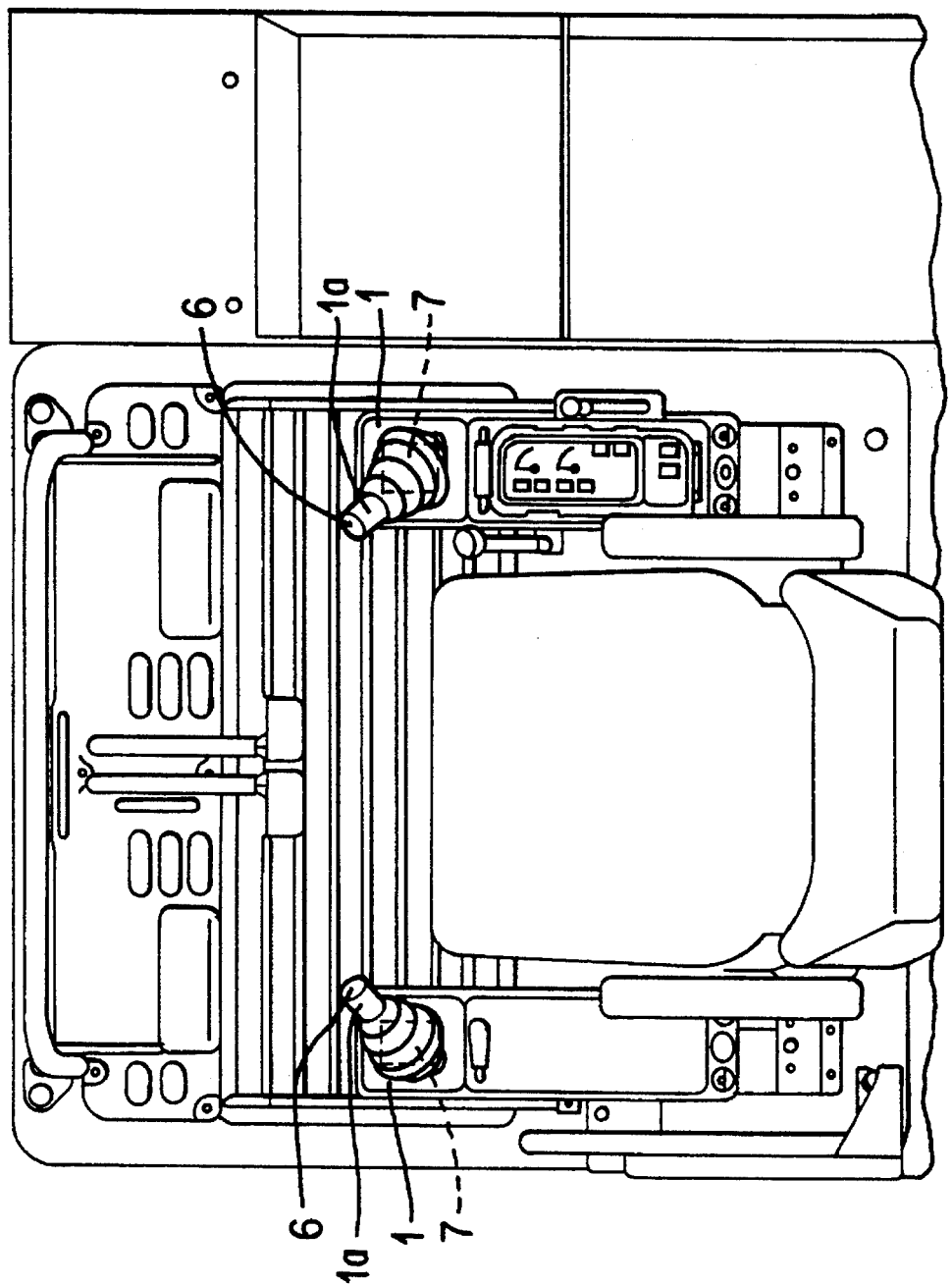
FIG. 1 is a plan view of an operator's seat.
Figure 2:
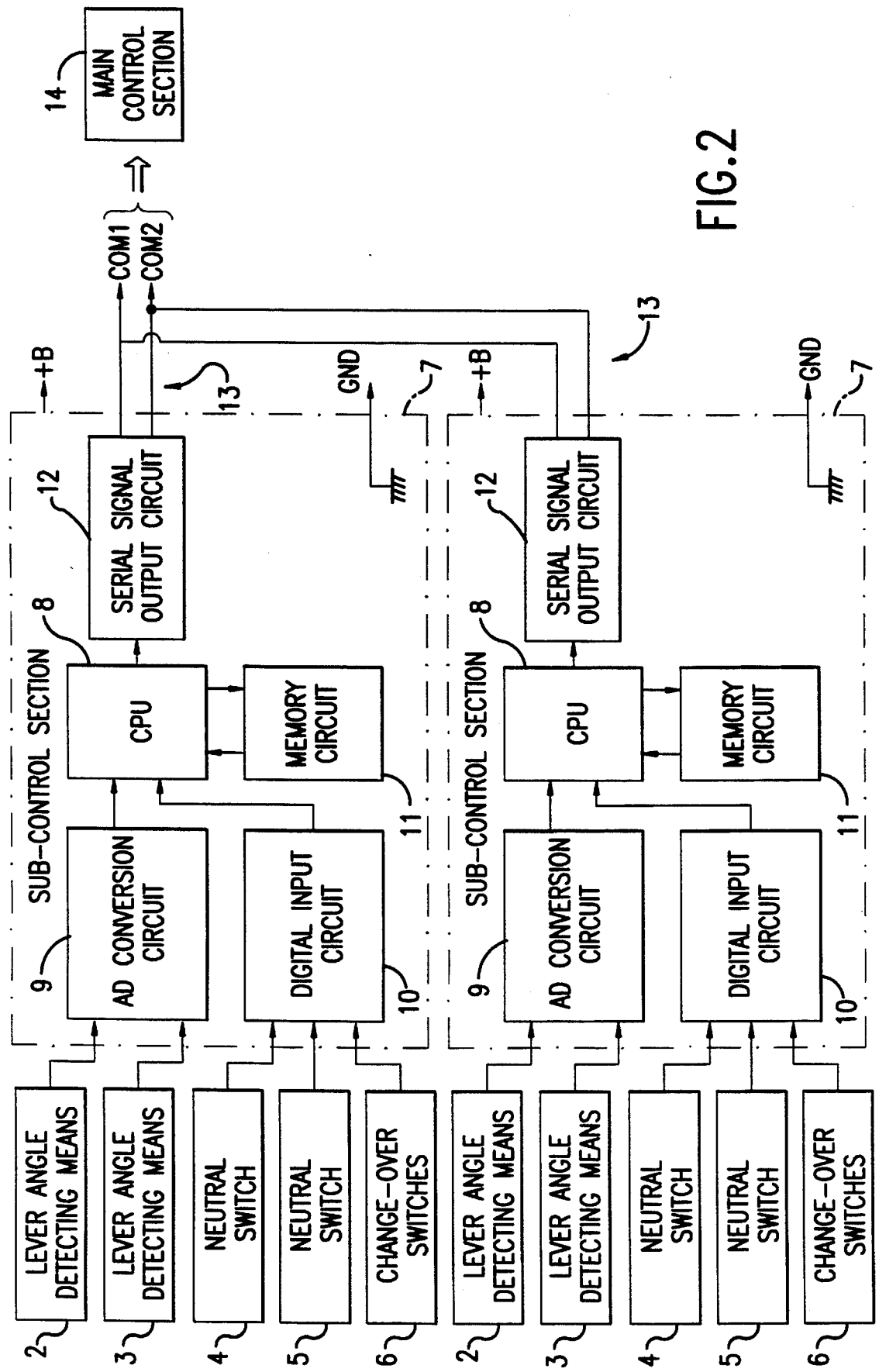
FIG. 2 is a block circuit diagram illustrating a first embodiment of the invention.

Embodiments of the present invention will now be described with reference to the drawings. Referring to FIGS. 1 and 2, reference numerals 1 each denote an operation box, one provided on the left hand side and the other on the right hand side of the operator's seat. In each of the operation boxes 1, there is provided a joy stick type operating lever 1a, which is operated two dimensionally in the X or Y direction. In each of the operating boxes 1 there is further provided respectively a lever angle detecting means 2 and 3 for detecting the operation angle in the X or Y direction of each lever 1a. The operation angle of each lever 1a, operated in the X or Y direction, is detected and, then, the corresponding detection signal data is generated. Further, in each of the operating boxes 1 there are provided respectively switches such as neutral switches, 4 and 5, for allowing data output when the operating levers I have been operated in the X or Y direction to a neutral position; and one or more change-over switches 6 for arbitrarily selecting a desired function. Data signals can be generated based on the operation of each switch 4, 5, or 6 as it has been generated conventionally. In each of the operating boxes 1, there can be provided in addition to the aforementioned operating levers 1a, and other types of switches, setting units which, for example, set the operation range. Such setting units will not be described below because they can be used as the aforementioned lever angle detecting means or switches.

Reference numerals 7 each denote a sub-control section which accepts input of signal data which have each been generated from the lever angle detecting means 2 and 3, and the switches 4, 5, and 6, respectively. Each sub-control section 7, which is provided in its respective operating box 1, is formed by various circuits: a central control circuit (CPU) 8, an AD conversion circuit (analog-to-digital converter) 9, a digital input circuit 10, a memory circuit 11, and a serial signal output circuit 12. The lever angle detecting means 2 and 3 are connected to the AD conversion circuit 9 such as to allow the detection signal data (in analog form) to be input to the AD conversion circuit 9. The detection signal data regarding the operation angle of each operating lever 1a in the X or Y direction is set such that it is converted into digital signals by the AD conversion circuit 9 and stored in the memory circuit 11. Switches such as the neutral switches 4 and 5 as well as the change-over switch or switches 6 are connected such that their corresponding signal data are each input to the digital input circuit 10. The input signal data are set such that they are stored in the memory circuit 11.

Figure 3:
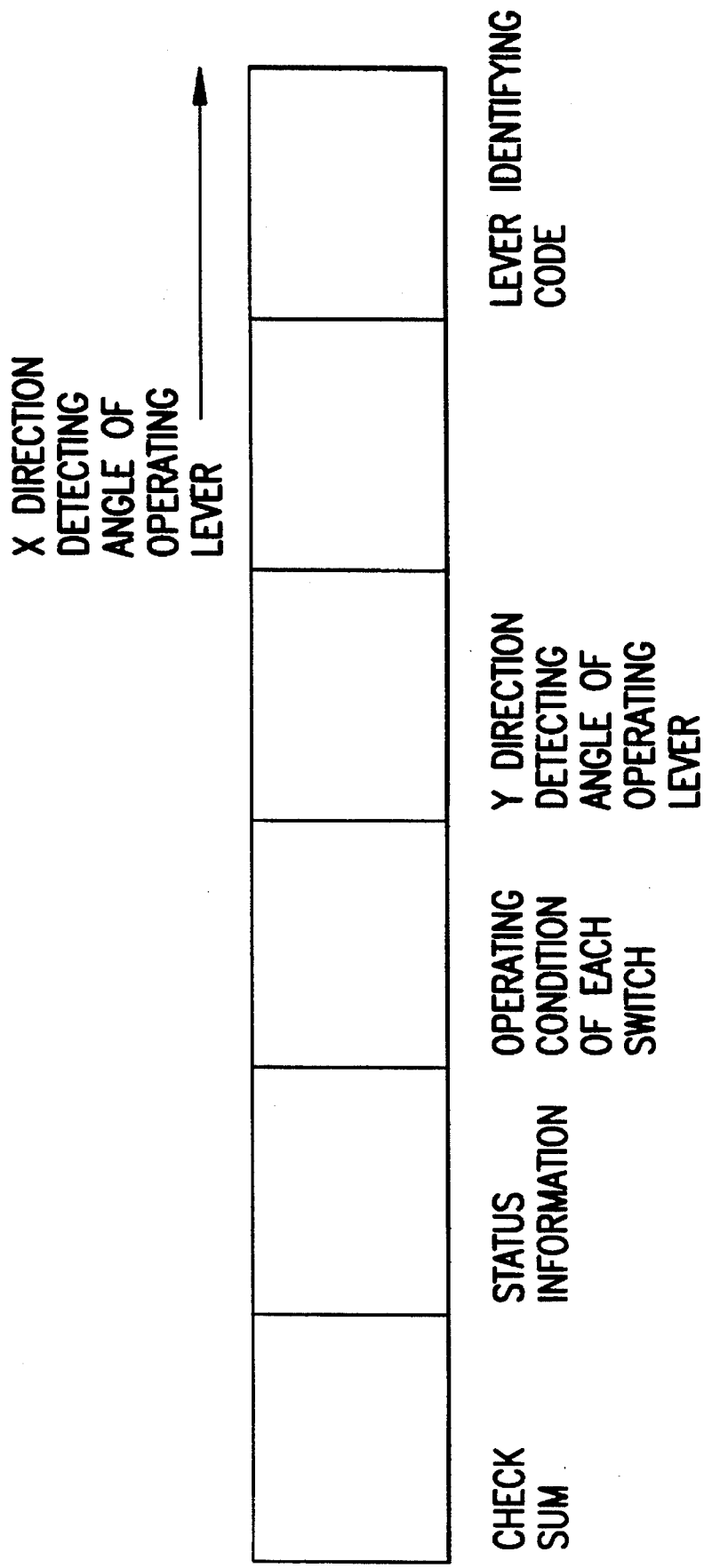
FIG. 3 is an explanatory view showing the order in which the signal data of a serial data are output in the first embodiment of the invention.

The central control circuit 8 reads in each signal data, which has been stored in the memory circuit 11. Then, these signal data, which have been read in, are rearranged into a proper order into one serial data. The serial data is set such that it is output via the serial signal output circuit 12. The different signal data, given below, comprising the serial data are output in the order shown in FIG. 3: (1) lever identification code for identifying the operating lever 1a (the right one or the left one); (2) detection angle corresponding to the lever operation angle in the X direction; (3) detection angle corresponding to the lever operation angle in the Y direction; (4) operating condition of each of the switches 4, 5, and 6; (5) status information (diagnosis information such as abnormal memory, faulty data, etc.); and finally (6) check sum data which is the sum total of all of the preceding data. The serial signal data, which have been arranged in this order, are set so that they are output from serial signal output lines 13, which are formed by COM 1 and COM 2 respectively, via the serial signal output circuit 12.

In the embodiment, each of the left and right operating levers 1a is provided with a sub-control section 7. The serial output lines 13 from the sub-control sections 7 are brought together to form one signal line, which is connected at a main control section 14 side. This allows signal data such as lever operation angle detection signal to be input to the main control section 14 with a minimum number of wire connections, irrespective of the number of operating levers 1a used. In this case, however, the serial data of each of the operating levers 1a may collide with each other at the point where the output lines meet. Accordingly, to overcome this problem, the embodiment provides in each of the sub-control sections 7 a communication scheduling function which allows detection of the condition of use of the aforementioned signal line and allows output of the serial data when the signal line is not used.

In the embodiment of the present invention which is constructed in the above-described manner, the angle detection data of each of the joy stick type operating levers 1a as well as the signal data from each of the switches 4, 5, and 6, are temporarily input to the respective sub-control sections 7 and then stored in the memory circuit 11. Then, these signal data are arranged to form serial data, which is transmitted from the serial signal output circuit 12 to the main control section 14 side. This allows the detection signal from the lever angle detecting means 2 and 3 and the signal data from each of the switches 4, 5, and 6 to be output from the same serial signal output line 13. Consequently, it is not necessary to use separate wires for each signal data for connection to the main control-section as has been used conventionally. This reduces the number of wire connections to the main control section 14, which permits connections to be carried out more easily and reduces costs.

In addition, in the embodiment, the serial signal output lines from the sub-control sections 7 (provided for the operating levers 1a) are brought together to form one signal line, which is connected to the main control section. This reduces the number of wires connected to the main control section, which significantly reduces the occurrence of faulty connections and makes the operating lever device highly reliable.

Further, in the device to which the present invention is applied, since self-diagnosis can be carried out by the central control circuit 8, any abnormality can be detected at the main control section 14 side to which is input signal data from the serial signal output circuit 12 by merely referring to the status information. Therefore, the load required for self diagnosis can be reduced. Various kinds of self-diagnosis can be freely performed, which include memory checking, monitoring the relationship between the lever operation input and the neutral switch ON/OFF state, and supply voltage. This results in a further higher reliability.

Figure 4:
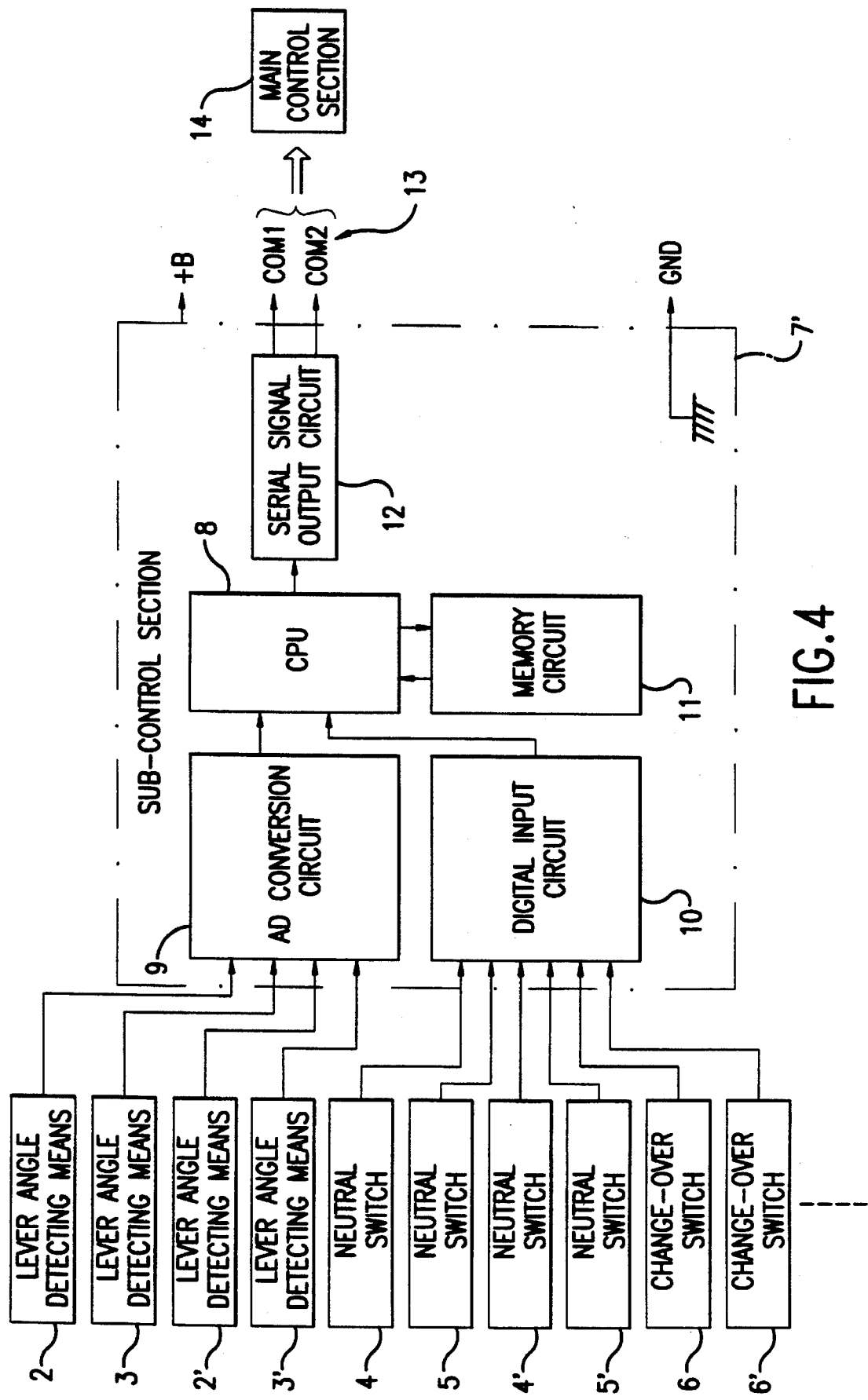
FIG. 4 is a block circuit diagram showing a second embodiment of the invention.
Figure 5:
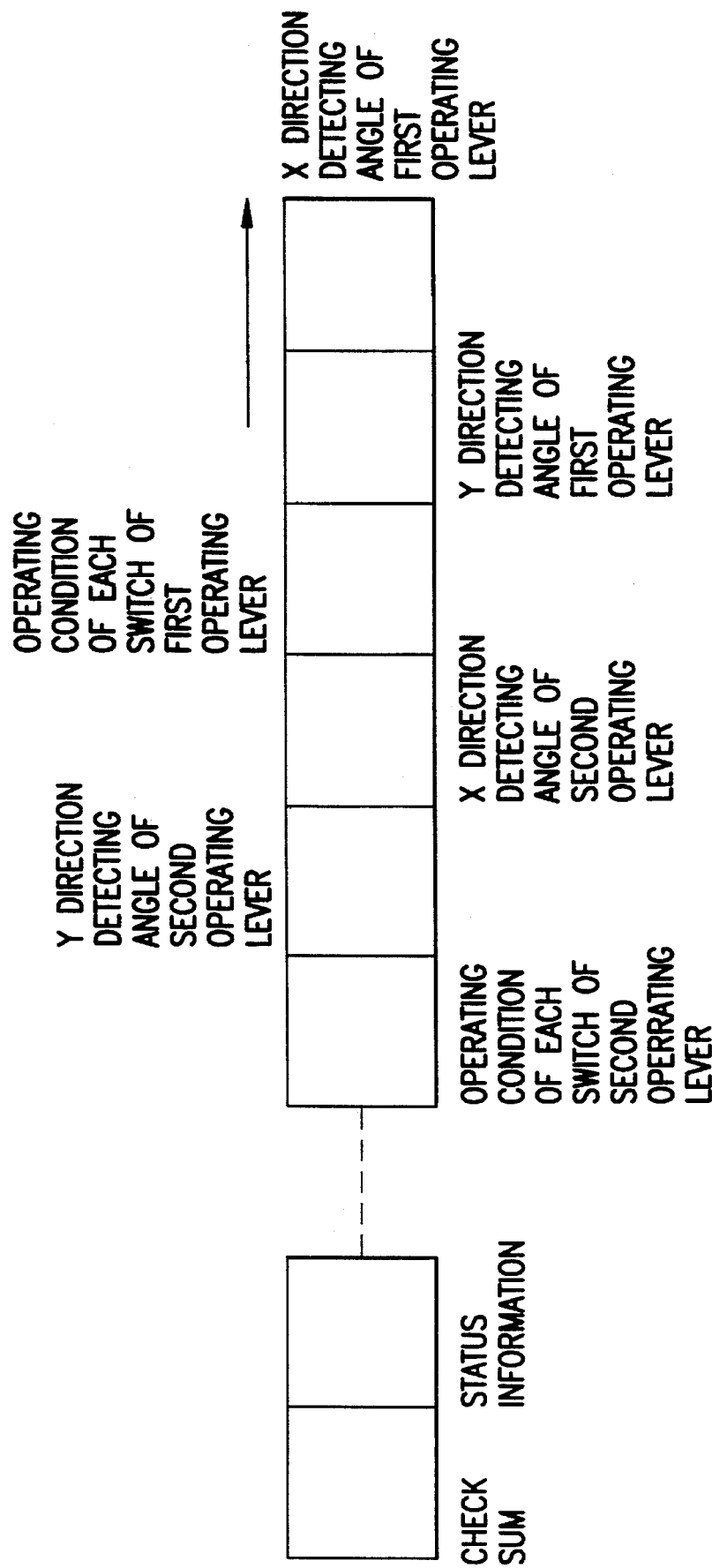
FIG. 5 is an explanatory view showing the order in which the signal data of a serial data are output in the second embodiment of the invention.
Figure 6:
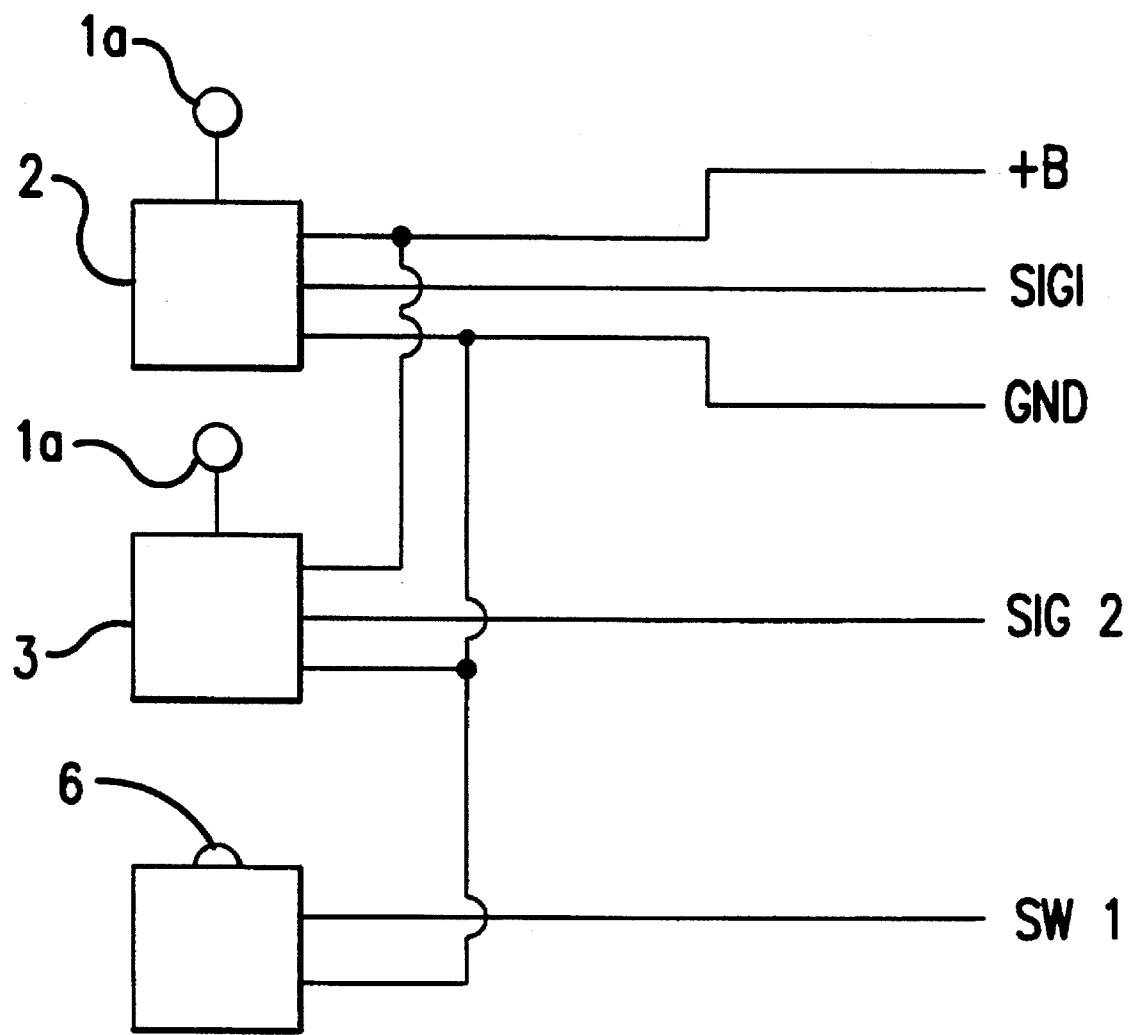
FIG. 6 is a wiring diagram of a conventional example.

The present invention is obviously not limited to the aforementioned embodiment. For example, in a second embodiment shown in FIG. 4, a plurality of operating levers 1a can be connected to a single sub-control section. In such a case, signal data from each of the operating levers 1a can be input to the main control section 14 by simply incorporating a plurality of signal data into a serial data, as shown in FIG. 5, without increasing the number of sub-control sections or signal output lines. For example, as illustrated in FIG. 2, for a single operation lever one X-direction and Y-direction lever angle detecting means 2 and 3 outputting analog signals respectively, are connected to the analog digital converter circuit 9. For two sets of operation levers, as illustrated in FIG. 4, two X-direction and Y-direction lever angle detecting means 2, 2' and 3, 3' outputting analog signals respectively, are connected to the analog digital conversion circuit 9. Likewise, for three sets of operation levers, three X-direction and Y-direction lever angle detecting means (not shown) outputting analog signals would be connected to the analog digital conversion circuit 9. As further shown by FIG. 4, the one to one relationship, between operation levers and input signals, exists for all input signals, including the X direction neutral switch 4, Y direction neutral switch 5, and change-over switch 6. The number of operation levers used is limited only by the capabilities of the receiving circuits of the sub-control section 7' while the number of output wires to the main control section does not increase. This significantly reduces the number of component parts and the number of wires, which leads to considerably reduced costs.

Accordingly, the present invention allows the number of wire connections to be reduced, so that wire connecting is simplified and costs are reduced. This is made possible by the construction of the invention in which signal data resulting from the operation of the joy stick type operating levers are each temporarily input in the sub-control section. Then, the signal data are rearranged into serial data and output to the main control section. The same signal line can be used between the sub-control section and the main control section, so that a wire is not required for every signal data as in conventional operating lever devices.

What is claimed is:

1. A joy stick type operating device, comprising:

lever operation angle detecting means for detecting an operation angle in the X or Y direction of a joy stick type operation lever of at least two joy stick type operating levers and outputting signal data for the operation angle of each joy stick type operating lever;

a sub-control section for accepting the signal data, which have been output from the detecting means, and for arranging the signal data into serial data, which is output to a main control section; and a serial signal output line linking the sub-control section and the main control section for passing the serial data.

2. The joy stick type operating lever device according to claim 1, wherein the serial data output from the sub-control section includes signal data which correspond to each joy stick type operating device of the plurality of joy stick type operating levers for lever identification.

3. A joy stick type operating device for controlling the orientation of an object, comprising:

at least two joysticks;

means for generating signals in relation to operation of each joy stick of the at least two joy sticks;

sub-control section means for accepting said signals for each toy stick and arranging said signals into serial data for each joy stick; and output means for conveying said serial data for each joy stick to a main object control section over a common transmission line.

4. The device according to claim 3, wherein said sub-control section means further comprises at least one sub-control section comprising:

an analog digital converter for converting a received analog signal from the means for generating signals into a digital output signal;

a digital input circuit for receiving an input digital signal from the means for generating signals;

a central control circuit for accepting signals from said analog digital converter and said digital input circuit and arranging said signals in a selected order;

a memory circuit for storing signals received from said central control circuit; and a serial data output circuit for outputting said signals arranged in the selected order to said main object control section.

5. The device according to claim 4, wherein said analog digital converter receives at least one signal indicative of angular displacement for each joy stick.

6. The device according to claim 4, wherein said digital input circuit further receives at least one signal from at least one switch associated with each joy stick.

7. The device according to claim 4, wherein said selected order of the arranged signals comprises origin identification, angular displacement, switch operating position, and general system analysis for each joy stick.

8. The device according to claim 6, wherein the selected order of said signals is signal origin identification, angular displacement of said joy stick, switch operating position, and general system analysis for each joy stick.

9. The device according to claim 7, wherein said general system analysis comprises detecting the integrity of said memory circuit, monitoring the relationship between a joy stick operation input and a neutral on/off state of said each joy stick, and the level of supply voltage.

10. The device according to claim 8, wherein said angular displacement occurs in an x-y cartesian plane.

11. A method for controlling the orientation of a joy stick type operating device, comprising the steps of:

detecting orientation of at least two joy sticks;

outputting analog signals in relation to each joy stick of the at least two joy sticks;

accepting said analog signals for each joy stick in an associated sub-control section;

converting said signals into digital serial data including arranging said signals in a selected order; and transmitting said selected order over at least one transmission line to a main object control section.

12. The method according to claim 11, wherein the step of converting further comprises converting the analog signals into digital signals and storing all digital signals in a memory circuit.

13. The method according to claim 11, wherein said selected order comprises digital signals of signal origin identification, angular displacement, switch operating position, and general system analysis for each joy stick.

14. The method according to claim 13, wherein said digital signals are arranged in an order of signal origin identification, angular displacement, switch operating position, and general system analysis for each joy stick.

* * * * *